UNITED STATES PATENT OFFICE.

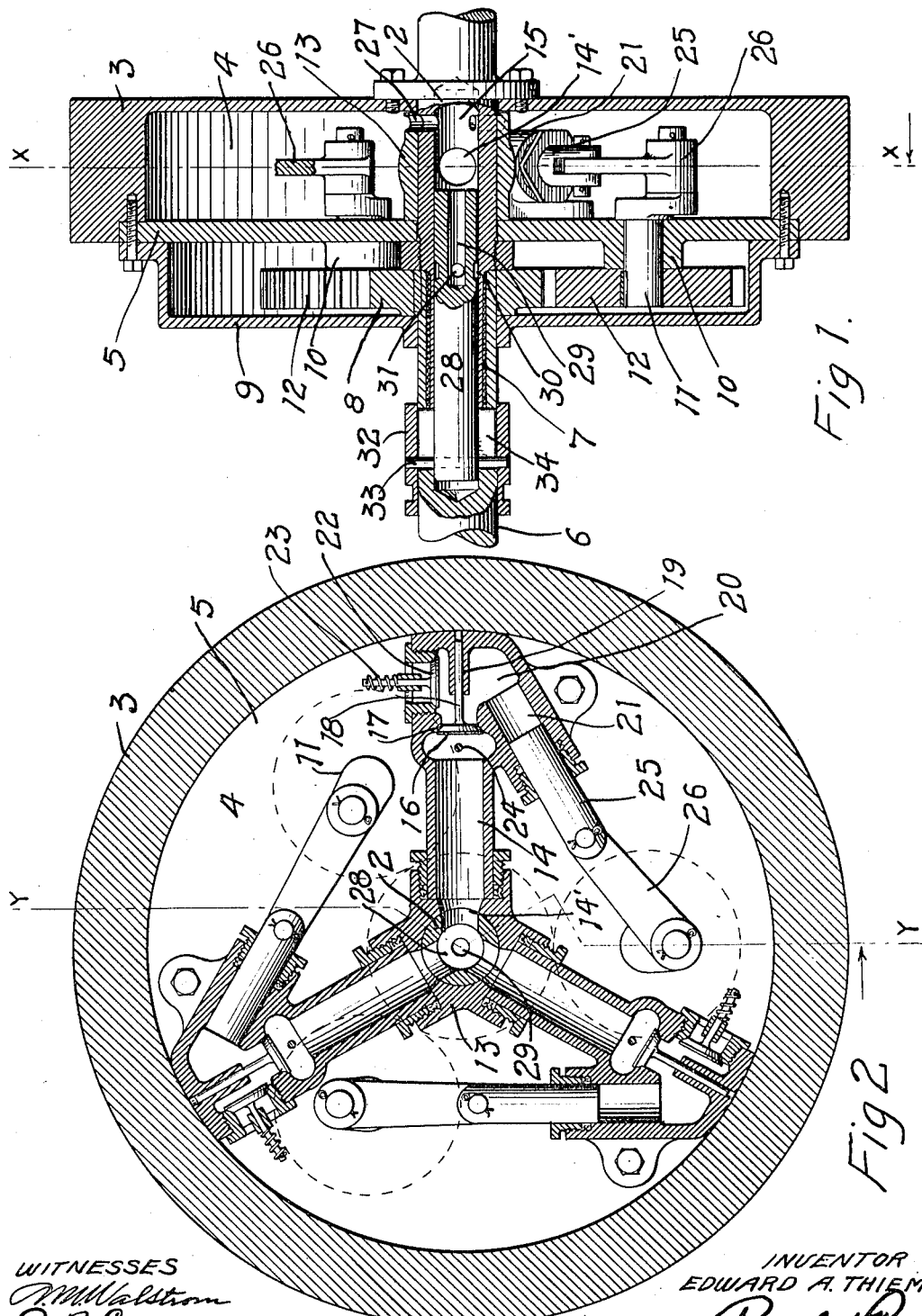

EDWARD A. THIEM, OF MINNEAPOLIS, MINNESOTA, ASSIGNOR OF ONE-FOURTH TO EDMUND G. WALTON, OF MINNEAPOLIS, MINNESOTA.

TRANSMISSION MECHANISM.

992,083.  Specification of Letters Patent.  Patented May 9, 1911.

Application filed July 25, 1906, Serial No. 327,724. Renewed October 21, 1910. Serial No. 588,368.

*To all whom it may concern:*

Be it known that I, EDWARD A. THIEM, of Minneapolis, Hennepin county, Minnesota, have invented certain new and useful Improvements in Transmission Mechanisms, of which the following is a specification.

My invention relates to devices for transmitting power and regulating speed; and the object of my invention is to provide a device whereby the transmission of power will be positive and any desired degree of speed of a driving shaft can be obtained for a driven shaft without the use of friction clutches or similar devices.

A further object is to provide a speed regulator by means of which the power of the driving shaft can be transmitted without shock or jerk to the driven shaft and its connections, thereby adapting the device particularly for use on automobiles.

My invention consists generally in a gear connected with a driven shaft and a series of idle planetary gears arranged to revolve around said first named gear, a series of fluid controlled pumps connected with said idle gears, and means within control of the operator for releasing or confining the fluid to release or lock said pumps and idle gears.

Further, the invention consists in various constructions and combinations, all as hereinafter described and particularly pointed out in the claims.

In the accompanying drawings, forming part of this specification; Figure 1 is a sectional view of a speed regulator embodying my invention, on the section line y—y of Fig. 2. Fig. 2 is a sectional view on the line x—x of Fig. 1.

In the drawing, 2 represents a driving shaft and 3 a fly wheel secured thereon and provided with an interior chamber 4 accessible on one side of the fly wheel by means of a removable plate 5.

6 is a driven shaft having its end telescoped with the end of the shaft 2 with a bearing sleeve 7 between them. On the end of the shaft 6 a sun gear 8 is keyed. A housing 9 incloses the said gear and is secured to the fly wheel preferably by the same means which holds the plate 5 thereon. Around the gear 8, and having their bearings in hubs 10 on the plate 5, are a series of, preferably three crank shafts 11 and upon these shafts planetary pinions 12 are keyed, having their teeth in engagement with the teeth of the gear 8.

Within the chamber 4 on the driving shaft 2, is a hub 13 and a series of, preferably three cylinders 14 radiating therefrom, the inner ends of said cylinders being open and communicating through passages 14' with a chamber 15 extending lengthwise of the driving shaft. At the outer ends of the cylinders, valves 16 are provided, fitting seats 17 and having stems 18 which are adapted to slide in sockets 19. These valves lead to chambers 20 which communicate on one side with pump cylinders 21 and on the other through valves 22 with the chamber 4. The valves 22 are normally held in their closed position by springs 23 while the valves 16 are held by centrifugal force against their seats and are limited in their inward movement by pins 24. Plungers 25 are provided in the cylinders 21, having crank connections 26 with the shafts 11. A reciprocation of the plungers 25 will have the effect of alternately opening the valves 22 and 16 and admitting the fluid to the chambers 20 and to the cylinders leading to the chamber 15, and through holes 27 in the walls of said chamber back into the fly wheel chamber 4, thus establishing a circulation of the fluid through the pumps and the shaft into the fly wheel chamber.

Within the chamber 15 a sliding plug valve 28 is provided, having a chamber 29 in one end open to the chamber 15, and an annular groove 30 communicating with the chamber 29 through port holes 31. The plug 28 has a reciprocating movement in the chamber 15 and is actuated by means of a collar 32 slidably mounted on the driven shaft and having a pin connection 33 with the plug 28 through a slot 34. By sliding the collar back and forth on the driven shaft the plug valve will be reciprocated and moved across the passages 14' leading from the cylinders 14 to the chamber 15 and increase or decrease the size of said openings to regulate the flow of the fluid therethrough, and thereby control the circulation of fluid through the pumps. The collar 32 is operated by means of a suitable lever mechanism (not shown).

To use the apparatus, the chamber 4 is supplied with a quantity of inelastic fluid such as oil and the driving shaft and fly wheel being in motion, the oil will be thrown out by centrifugal force to the circumference of chamber 4 in convenient position to enter through the valves 22 when they are opened by the action of the pumps. So long as the passages 14' are open and unobstructed, the oil will flow through the chambers and cylinders and circulate freely between the fly wheel and driving shaft chambers and the pinions 12 will be allowed to revolve idly without transmitting their movement to the gear 8 between them. As soon, however, as it is desired to set the driven shaft in motion, the operator will move the plug 28 and partially close the passages 14' and cut off the free circulation of the oil therethrough and cause the temporary checking and locking of the pump plungers thereby preventing the pinions 12 from turning and causing the power of the driving shaft to be transmitted through the said pinions to the gear 8 and from thence to the driven shaft.

I prefer to provide three of the pinions and the pumps in connection therewith, and at least two of the gears and their pumps will be locked simultaneously, their stroke being so arranged that the plungers will be on the compression part of the stroke at the same time, and their gears will be locked to insure the transmission of power from the driving to the driven shaft. In case of any leakage of the oil past the end of the plug valve 28, it will flow into the annular groove 30 and from thence into the chamber 29 and back to the fly wheel chamber. The circulation of the oil can thus be perfectly controlled and the speed of the driven shaft easily regulated without any jar or shock usually incident to the starting of a driven shaft by means of an ordinary friction clutch.

With this device the shaft can be smoothly and easily set in motion and its speed increased or decreased by merely varying the size of the opening through which the oil is discharged from the pump cylinders. The device is therefore particularly adapted for use on automobiles where it is desirable to provide means for changing the speed without jerk to the machinery or jar to the occupants of the car. If the plug is moved to entirely close the outlets from the oil cylinders, then the pumps will be positively locked and the full speed and power of the driving shaft will be transmitted to the driven shaft. If, however, slower speed is desired, then the plug will be adjusted to allow the escape of a portion of the oil into the chamber 15 and from thence to the fly wheel chamber, whereupon the pinions 12 will be allowed a slight movement or slippage and a portion of the power from the driving shaft will be lost. To disconnect the shafts the plug will be thrown to the position indicated in Fig. 1, exposing the full size of the opening from the oil cylinders and allowing the free circulation of the oil through the cylinders and the fly wheel chamber.

I claim as my invention:

1. The combination, with a rotary driving machine element having a chamber, of a driven element, a sun gear secured to said driven element, a fly wheel having a chamber secured to said driving element, a series of planetary gears mounted in said fly wheel and engaging said sun gear, a series of pumps provided in said fly wheel chamber and having their pistons operatively connected with said planetary gears, said fly wheel chamber containing a supply of inelastic fluid and connected with said driving element chamber, and means for controlling the circulation of said inelastic fluid through said pumps and thereby locking said planet gears or releasing the same, substantially as described.

2. The combination, with a rotary driving machine element having a chamber, of a driven element, a sun gear secured to said driven element, a fly wheel having a chamber secured to said driving element, a series of planetary gears mounted in said fly wheel and engaging said sun gear, a series of pumps provided in said fly wheel chamber and having their pistons operatively connected with said planetary gears, said chamber containing a supply of inelastic fluid and connected with said driving element chamber, and a valve located in said driving element chamber arranged to control the circulation of said inelastic fluid through said pumps and thereby lock said gears or release the same, substantially as described.

3. The combination, with a driving shaft having a chamber and a fly wheel also having a chamber containing a supply of inelastic fluid, of a driven shaft, a gear secured on said driven shaft, a series of pinions having bearings in said fly wheel and engaging the teeth of said gear, a series of pumps provided in said fly wheel chamber, and having their pistons operatively connected with said pinions, valves leading to said chamber and passages communicating with said shaft chamber and said driving shaft chamber having ports leading to said fly wheel chamber and a valve provided in said driving shaft chamber, and arranged to cut off the flow of fluid thereto from said pump cylinders and thereby lock said pump pistons.

4. The combination, with a driving shaft having a chamber and a fly wheel also having a chamber communicating with the chamber in said driving shaft and containing a supply of inelastic fluid, of a driven shaft, a gear secured thereon, a series of pinions inclosing said gear and meshing therewith, a series of cylinders arranged in said fly wheel chamber, and having ports leading to said fly wheel and driving shaft chambers, valves provided in said cylinders, and normally closing the same against the entrance of said inelastic fluid from said fly wheel chamber, pump cylinders having their pistons arranged to open said valves and on the suction stroke admit fluid to said cylinders and allow said valves to close on the compression stroke and cut off the flow therethrough, said pump cylinders having their pistons connected with said idle pinions, and a valve slidably arranged in said driving shaft chamber to regulate the circulation of said inelastic fluid therethrough, whereby the movement of said pump pistons will be temporarily checked and said idle pinions locked in engagement with said gear to drive the same, substantially as described.

In witness whereof, I have hereunto set my hand this 12th day of July 1906.

EDWARD A. THIEM.

Witnesses:
RICHARD PAUL,
J. B. ERA.